United States Patent [19]

Priddy

[11] Patent Number: 6,156,855
[45] Date of Patent: Dec. 5, 2000

[54] PRODUCTION OF BRANCHED POLYMERS

[75] Inventor: Duane B. Priddy, Midland, Mich.

[73] Assignee: The Dow Chemical Company, Midland, Mich.

[21] Appl. No.: 09/202,741

[22] PCT Filed: Jun. 27, 1997

[86] PCT No.: PCT/US97/11265

§ 371 Date: Dec. 15, 1998

§ 102(e) Date: Dec. 15, 1998

[87] PCT Pub. No.: WO98/03556

PCT Pub. Date: Jan. 29, 1998

Related U.S. Application Data

[60] Provisional application No. 60/021,955, Jul. 18, 1996.

[51] Int. Cl.[7] .............................. C08F 2/38; C08F 212/08
[52] U.S. Cl. .............................. 526/82; 526/89; 526/347; 526/347.1; 526/296; 526/292.2; 526/292.4; 526/292.7; 526/307.1; 526/307.2; 526/318.2; 526/318.45
[58] Field of Search ................................. 526/82, 89, 347, 526/347.1, 347.2, 296, 292.2, 292.4, 292.7, 307.1, 307.2, 318.2, 318.45

[56] References Cited

U.S. PATENT DOCUMENTS 5,408,023  4/1995  Priddy et al. ............................ 526/262

FOREIGN PATENT DOCUMENTS

WO 95/12568  5/1995  WIPO .

*Primary Examiner*—David W. Wu
*Assistant Examiner*—R. Harlan

[57] ABSTRACT

The present invention is a free radical polymerization process for producing a branched polymer which comprises polymerizing a vinyl aromatic monomer in the presence of a molecular weight regulator which allows for the rapid production of high molecular weight and highly branched polymers without the formation of gels.

8 Claims, No Drawings

PRODUCTION OF BRANCHED POLYMERS

CROSS REFERENCE STATEMENT

This application claims the benefit of U.S. Provisional Application Ser. No. 60/021,955, filed Jul. 18, 1996.

This invention relates to a process for preparing a branched polymer from a vinyl aromatic monomer in the presence of a molecular weight regulator.

The use of molecular weight regulators or chain transfer agents in polymerization reactions are known in the art. Alkanethiols have been used traditionally, but have an objectionable odor, can lead to wide weight average molecular weight (Mw) distribution and don't allow for the production of telechelic or living polymers.

U.S. Pat. No. 3,271,375 by Delacretaz et al. discloses a free radical polymerization process wherein a polar monomer is polymerized in the presence of a molecular weight regulator, such as 2-methyl-indole. However, this process produces a substantially linear, low molecular weight polymer.

Additionally, U.S. Pat. No. 5,385,996 by Rizzardo et al. discloses the use of molecular weight regulators of the formula $CH_2=C(Y)R$, such as α-(t-butanethiomethyl) styrene, to produce a lightly branched polymer via an addition-fragmentation mechanism. However, the molecular weight regulators used in the process of Rizzardo have low activity, therefore low levels of branching occur and high levels of the unreacted molecular weight regulator contaminate the final polymer product.

Branched polymers have also been previously produced by polymerizing a vinyl aromatic monomer in the presence of a vinyl functional initiator, such as n-butyl-t-butylperoxyfumarate, as described in U.S. Pat. No. 4,376,847. However, in this method, branching occurs in the early stages of the polymerization, causing gels to form. Gels tend to build up after extended periods of continuous operation and lead to reactor fouling as discussed in US-A-5,455,321 issued to Cummings, et al.

Accordingly, it remains highly desirable to provide an efficient method of producing a high molecular weight branched polymer from a vinyl aromatic monomer which allows for high levels of branching and the production of telechelic or living polymers, without the production of gels.

SUMMARY OF THE INVENTION

The present invention is a free radical polymerization process for producing a branched polymer which comprises polymerizing a vinyl aromatic monomer in the presence of a molecular weight regulator of the formula $R^1 CH_2(R'')C=CHR'''$, wherein $R^1$ is a leaving group and $R''$ and $R'''$ are each activating groups.

This process produces high molecular weight branched polymers, which have improved properties over linear polymers in extensional rheology, melt strength, and viscosity.

DESCRIPTION OF THE PREFERRED EMBODIMENTS

Vinyl aromatic monomers suitable for use according to the present invention include, but are not limited to, those vinyl aromatic monomers known for use in polymerization processes, such as those described in U.S. Pat. No. 4,666,987, U.S. Pat. No. 4,572,819 and U.S. Pat. No. 4,585,825, which are herein incorporated by reference. Preferably, the monomer is of the formula:

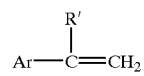

wherein R' is hydrogen or methyl, Ar is an aromatic ring structure having from 1 to 3 aromatic rings with or without alkyl, halo, or haloalkyl substitution, wherein any alkyl group contains 1 to 6 carbon atoms and haloalkyl refers to a halo substituted alkyl group. Preferably, Ar is phenyl or alkylphenyl, wherein alkylphenyl refers to an alkyl substituted phenyl group, with phenyl being most preferred. Typical vinyl aromatic monomers which can be used include: styrene, alpha-methylstyrene, all isomers of vinyl toluene, especially paravinyltoluene, all isomers of ethyl styrene, propyl styrene, vinyl biphenyl, vinyl naphthalene, vinyl anthracene, and mixtures thereof. The vinyl aromatic monomers may also be combined with other copolymerizable monomers. Examples of such monomers include, but are not limited to acrylic monomers such as acrylonitrile, methacrylonitrile, methacrylic acid, methyl methacrylate, acrylic acid, and methyl acrylate; maleimide, phenylmaleimide, and maleic anhydride. In addition, the polymerization may be conducted in the presence of predissolved elastomer to prepare impact modified, or grafted rubber containing products, examples of which are described in U.S. Pat. No. 3,123,655, U.S. Pat. No. 3,346,520, U.S. Pat. Nos. 3,639,522, and 4,409,369.

The molecular weight regulators used in the process of the present invention are of the formula $R^1CH_2(R'')C=CHR'''$, wherein $R^1$ is a leaving group and $R''$ and $R'''$ are each activating groups. A leaving group is defined as a group which is cleaved from the compound upon the reaction of a polymer radical with the double bond. The leaving group should also be capable of initiating polymerization once cleavage has occurred. Generally, $R^1$ can be selected from groups such as Cl, Br, I, or $X(R^4)_n$, wherein X is an element other than carbon selected from Groups IV, V, VI or VII of the Periodic Table, or a group consisting of an element selected from Groups IV, V, or VI to which is attached one or more oxygen atoms, n is a number from 0 to 3, such that the valency of X is satisfied, and when n is greater than 1, the groups represented by $R^4$ may be identical or different, wherein $R^4$ is an optionally substituted alkyl, alkenyl, or alkynyl group, or optionally substituted saturated, unsaturated, or aromatic carbocyclic or heterocyclic ring. Optionally substituted refers to the possibility that these groups may contain other substituents which will not negatively affect the molecular weight regulating properties of the compound or the polymer initiating capability of the leaving group.

Elements suitable for X can be selected from any of the elements of Groups IV, V, VI or VII of the Periodic Table. Typical elements for X include but are not limited to sulfur, silicon, selenium, phosphorus and tin. X may also be a group which comprises an element from Groups IV, V or VI to which is attached one or more oxygen atoms. Typical groups include but are not limited to phosphonates, sulphoxides, sulfones, and phosphine oxides.

Alkyl groups typically contain from 1 to 20, preferably from 1 to 15, more preferably from 1 to 10 and most preferably from 1 to 8 carbon atoms. Alkenyl and alkynyl groups typically contain from 2 to 20, preferably from 2 to 15, more preferably from 2 to 10 and most preferably from 2 to 8 carbon atoms. Saturated, unsaturated carbocyclic or heterocyclic rings typically contain from 3 to 14, preferably from 3 to 12, more preferably from 3 to 10 and most preferably from 3 to 6 carbon atoms. Aromatic carbocyclic rings typically contain from 6 to 10, preferably from 6 to 8 and most preferably 6 carbon atoms.

The activating group of R' or R''' is defined as a group wherein the point of attachment must be a carbon atom which is unsaturated or aromatic, such as in an alkenyl, cyano, carboxyl or aryi group. In other words, the carbon which is bonded directly to the vinyl group must be unsaturated in order to activate the vinyl group.

Typical molecular weight regulators used in the process of the present invention include but are not limited to one or more compounds of formula:

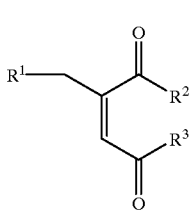

(I)

wherein $R^1$ is as defined previously, and $R^2$ and $R^3$ may be the same or different and are selected from OH, $NH_2$, OR, NHR, or $NR_2$; wherein R is optionally substituted alkyl or aryl; and/or

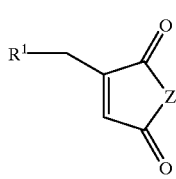

(II)

wherein $R^1$ is as defined previously and Z is O, N—H, N-alkyl, N-aryl, or N-aralkyl.

Aryl refers to an aromatic hydrocarbon, typically containing from 1 to 6 rings, preferably from 1 to 5 rings, more preferably from 1 to 3 rings and most preferably containing 1 or 2 rings, wherein rings are as defined above. Optionally substituted alkyl or aryl refers to the possibility that other substituents may be present on the alkyl or aryl group which will not negatively affect the molecular weight regulating properties of the compound or the polymer initiating capability of the leaving group. Aralkyl refers to an alkyl group, as defined previously, in which a hydrogen has been replaced with an aryl group.

In a preferred embodiment, the molecular weight regulator is of formula II, $R^1$ is Br and Z is O.

Molecular weight regulators of this kind can be prepared by several known methods in the art. For example, itaconic anhydride can be reacted with bromine and dehydrohalogenated with a base as disclosed in Chem. Lett. (4) pgs. 541–4: (1986), to produce bromocitroconic anhydride. Alternatively, citroconates containing a methyl group in the desired position can halogenated by free radical addition. To obtain other nucleophiles in the position occupied by the halogen, known methods of halogen displacement or exchange can be used.

Initiators may be used in the process of the present invention in combination with the molecular weight regulators described above. Useful initiators include free radical initiators such as peroxide and azo compounds which will accelerate the polymerization of the vinyl aromatic monomer. Suitable initiators include but are not limited to t-butylhydroperoxide, ditertiary-butylperoxide, cumene hydroperoxide, dicumyl peroxide, 1,1 -bis(tertiary-butylperoxy)-3,3,5-trimethylcyclohexane, t-butylperoxybenzoate, 1,1-bis(t-butylperoxy)cyclohexane, benzoylperoxide, succinoylperoxide and t-butylperoxypivilate, and azo compounds such as azobis-isobutyronitrile, azobis-2,4-dimethyl-valeronitrile, azobiscyclohexanecarbonitrile, azobismethylisolactate and azobiscyanovalerate. Typical amounts are well known in the art and may be used in the process of the present invention providing that the total amount of initiator will be such that a polymer having at least a Mw of 75,000 is produced.

The process of the present invention can also be conducted in the presence of solvent. Solvents useful in the process of the present invention include but are not limited to ethyl benzene, benzene, and toluene.

Other additives can also be used in the process of the present invention including lubricants, oxidation inhibitors, plasticizers, flame retarding agents, photo stabilizers, coloring agents, fiber reinforcing agents, and fillers.

Polymerization processes and process conditions for the polymerization of vinyl aromatic monomers are well known in the art and can be used in the process of the present invention. Although any polymerization process can be used, typical processes are continuous bulk or solution polymerizations as described in U.S. Pat. No. 2,727,884 and U.S. Pat. No. 3,639,372. The polymerization is typically conducted at temperatures from 80 to 170° C., preferably from 90 to 160° C., more preferably from 100 to 155° C., and most preferably from 110 to 150° C.

The vinyl aromatic monomer can be combined with the molecular weight regulator prior to or in the early stages of polymerization. Typically, the molecular weight regulator is added to the monomer feed prior to polymerization.

The amount of molecular weight regulator added to the vinyl aromatic monomer is typically from 0.001 to 2 weight percent based on the total weight of vinyl aromatic monomer and molecular weight regulator, preferably from 0.01 to 1, more preferably from 0.05 to 1, and most preferably from 0.05 to 0.5 weight percent.

The polymerization is conducted for a sufficient amount of time, such that the desired conversion is achieved. The amount of time needed is dependent upon the temperature of the polymerization, the amount of initiator and the amount of molecular weight regulator. Typically, the polymerization is conducted from 1 to 20 hours, preferably from 1.5 to 10 hours, more preferably from 2 to 8 hours and most preferably from 2.5 to 6 hours.

Another aspect of the present invention relates to high molecular weight branched polymers produced by the process described previously. The Mw of the polymer produced by the process of the present invention can vary over a broad range depending on the desired product. Generally, the Mw can be from 75,000 to 800,000 as measured by gel permeation chromatography (GPC); typically from 90,000, preferably from 100,000, more preferably from 150,000, and most preferably from 200,000 to 700,000, preferably to 600,000, more preferably to 550,000 and most preferably to 500,000.

The polymers produced by the process of the present invention can be useful in foam board, foam sheet and injection molded and extruded products.

The following examples are provided to illustrate the present invention. The examples are not intended to limit the scope of the present invention and they should not be so interpreted. Amounts are in weight parts unless otherwise indicated.

Preparation of Bromocitroconic Anhydride

A solution of 30.31 grams (g)(0.27 mole) of itaconic anhydride in 120 milliliters (mL) of chloroform is refluxed and stirred while a solution of 45.03 g (0.28 mole) of bromine in 30 mL of chloroform is added dropwise over a period of 30 minutes. The mixture is refluxed and stirred for 3.5 hours and cooled to 25° C. The chloroform is then removed by rotary evaporation at reduced pressure. A white solid is formed and collected by filtration, washed with 15

TABLE I

| | BrCitAn | | NDM* | | BrMMA* | | Control* | |
|---|---|---|---|---|---|---|---|---|
| Time (h) | I % Styrene Conversion | I Mw | II % Styrene Conversion | II Mw | III % Styrene Conversion | III Mw | IV Styrene Conversion | IV Mw |
| 0.25 | 3 | 10 | 6 | 23 | 5 | 25 | 6 | 349 |
| 0.5 | 7 | 40 | 12 | 31 | 10 | 32 | 13 | 296 |
| 0.75 | 17 | 110 | 21 | 48 | 13 | 38 | 23 | 287 |
| 1 | 27 | 217 | 28 | 69 | 18 | 53 | 31 | 284 |
| 1.5 | 35 | 256 | 43 | 111 | 28 | 86 | 39 | 285 |
| 2 | 49 | 298 | 51 | 146 | 40 | 138 | 54 | 299 |
| 3 | 67 | 320 | 68 | 187 | 57 | 230 | 70 | 302 |
| 4 | 77 | 332 | 80 | 215 | 72 | 292 | 84 | 308 |
| 5 | 81 | 336 | 85 | 211 | 80 | 319 | 86 | 307 |
| 6 | 84 | 335 | 87 | 214 | 82 | 326 | 88 | 307 |

BrCitAn = α-bromocitroconic anhydride
NDM = n-dodecyl mercaptan
BrMMA = methyl-2-(bromomethyl)acrylate
Control = no molecular weight regulator added
Mw = weight average molecular weight
*Comparative Examples mL of chloroform and dried in a vacuum desiccator to yield 53.2 g of 2-bromo-2-(bromomethyl)succinic anhydride.

24.03g (0.091 mole) of 2-bromo-2-(bromomethyl) succinic anhydride is dissolved in 50 mL of anhydrous diethyl ether maintained at 25° C. The solution is stirred while adding 20.61 g(0.1 mole) of 1,3-dicyclohexylcarbodiimide in 50 mL of diethyl ether dropwise over 1 hour. The resulting solution is stirred at 25° C. for 12 hours. The solvent is removed by rotary evaporation at reduced pressure to yield a brown oil which is subjected to flash chromatography on silica gel using hexane-chloroform (1:4) as eluent to provide 12.5 g of α-bromocitroconic anhydride.

EXAMPLE I

A 0.01 molar solution of α-bromocitroconic anhydride and styrene (2 mL) is placed in ten ⅜×12 inch glass ampoules. The ampoules are vacuum sealed and placed in an oil bath at 140° C. One ampoule is removed from the oil bath at various time intervals and the percent styrene conversion and molecular weight is determined using GPC. Results are listed in Table I.

EXAMPLE II (COMPARATIVE)

The process of Example I is repeated using n-dodecylmercaptan as the molecular weight regulator at a concentration of 0.1 molar. The results are listed in Table I.

EXAMPLE III (COMPARATIVE)

The process of Example I is repeated using methyl-2-(bromomethyl)acrylate (as the molecular weight regulator at a concentration of 0.1 The results are listed in Table I.

EXAMPLE IV (COMPARATIVE)

The process of Example I is repeated without a molecular weight regulator (Control). The results are listed in Table I.

The polymerization using BrCitAn produces lower Mw polymer during the very early stages of polymerization (that is, at monomer conversion of <10 percent), but then builds Mw more rapidly than those of the comparative examples, thus producing a high molecular weight and more highly branched polymer. 42412A

What is claimed is:

1. A free radical polymerization process for producing a branched polymer comprising polymerizing a vinyl aromatic monomer in the presence of a molecular weight regulator of the formula $R^1 CH_2 (R")C = CHR'''$, wherein $R^1$ is a leaving group and R" and R''' are both activating groups.

2. The process of claim 1 wherein the vinyl aromatic monomer is styrene.

3. The process of claim 1 wherein the molecular weight regulator is one or more compounds of formula:

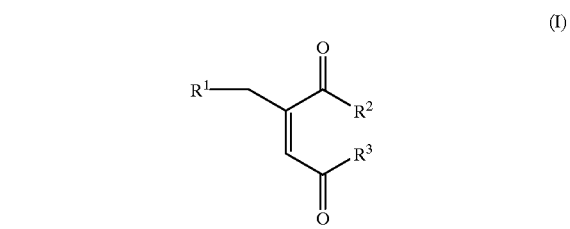

(I)

wherein $R^1$ is Cl, Br, I, or $X(R^4)_n$;

X is an element other than carbon selected from Groups IV, V, VI or VII of the Periodic Table, or a group consisting of an element selected from Groups IV, V, or VI to which is attached one or more oxygen atoms;

n is a number from 0 to 3, such that the valency of X is satisfied, and when n is greater than 1, the groups represented by $R^4$ may be identical or different;

$R^4$ is an optionally substituted alkyl, alkenyl, or alkynyl group, or optionally substituted saturated, unsaturated, or aromatic carbocyclic or heterocyclic ring; and $R^2$ and $R^3$ may be the same or different and are selected from OH, $NH_2$, OR, NHR, or $NR_2$; wherein R is optionally substituted alkyl or aryl; and/or

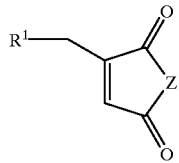

(II)

wherein $R^1$ is as defined previously and Z is O, N—H, N-alkyl, N-aryl, or N-aralkyl.

4. The process of claim 3 wherein $R^1$ is Br.

5. The process of claim 4 wherein the molecular weight regulator is of formula II, $R^1$ is Br and Z is O.

6. A high molecular weight branched polymer produced according to the process of claim 1.

7. The polymer of claim 6 having a Mw of from 75,000 to 800,000.

8. The polymer of claim 7 having a Mw of from 100,000 to 500,000.

* * * * *